US011996633B2

(12) United States Patent
Cheng et al.

(10) Patent No.: US 11,996,633 B2
(45) Date of Patent: May 28, 2024

(54) WEARABLE DEVICE WITH ANTENNA STRUCTURE THEREIN

(71) Applicant: Quanta Computer Inc., Taoyuan (TW)

(72) Inventors: Chun-I Cheng, Taoyuan (TW); Chung-Ting Hung, Taoyuan (TW); Chin-Lung Tsai, Taoyuan (TW); Kuan-Hsien Lee, Taoyuan (TW); Yu-Chen Zhao, Taoyuan (TW); Kai-Hsiang Chang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 117 days.

(21) Appl. No.: 17/929,900

(22) Filed: Sep. 6, 2022

(65) Prior Publication Data

US 2024/0030615 A1 Jan. 25, 2024

(30) Foreign Application Priority Data

Jul. 19, 2022 (TW) .................................. 111127026

(51) Int. Cl.
*H01Q 1/27* (2006.01)
*H01Q 5/20* (2015.01)
(Continued)

(52) U.S. Cl.
CPC ............. *H01Q 5/378* (2015.01); *H01Q 1/273* (2013.01); *H01Q 5/20* (2015.01); *H01Q 5/371* (2015.01)

(58) Field of Classification Search
CPC ... H01Q 1/243; H01Q 1/273; H01Q 5/30–392
See application file for complete search history.

(56) References Cited

U.S. PATENT DOCUMENTS 8,537,054 B2 * 9/2013 Yen ........................ H01Q 1/243 343/846
8,779,986 B2 * 7/2014 Fan ........................ H01Q 5/371 343/700 MS
(Continued)

FOREIGN PATENT DOCUMENTS

TW 765743 B 5/2022

OTHER PUBLICATIONS

Chinese language office action dated Mar. 13, 2023, issued in application No. TW 111127026.

*Primary Examiner* — Ab Salam Alkassim, Jr.
(74) *Attorney, Agent, or Firm* — McClure, Qualey & Rodack, LLP

(57) ABSTRACT

A wearable device includes a ground element, a first radiation element, a second radiation element, a third radiation element, a fourth radiation element, and a fifth radiation element. The first radiation element has a feeding point, and is coupled to a first grounding point on the ground element. A slot region is surrounded by the first radiation element and the ground element. The second radiation element is coupled to a second grounding point on the ground element. The third radiation element is coupled to the second grounding point. The third radiation element and the second radiation element substantially extend in opposite directions. The fourth radiation element and the fifth radiation element are disposed inside the slot region. An antenna structure is formed by the first radiation element, the second radiation element, the third radiation element, the fourth radiation element, and the fifth radiation element.

9 Claims, 3 Drawing Sheets

(51) Int. Cl.
*H01Q 5/371* (2015.01)
*H01Q 5/378* (2015.01)

(56) References Cited

U.S. PATENT DOCUMENTS

| | | | | |
|---|---|---|---|---|
| 9,627,755 | B2 * | 4/2017 | Lin | H01Q 5/335 |
| 11,038,254 | B2 * | 6/2021 | Chang | H01Q 5/30 |
| 11,133,605 | B2 * | 9/2021 | Wei | H01Q 21/30 |
| 11,211,708 | B2 * | 12/2021 | Lo | H01Q 9/30 |
| 11,824,568 | B2 * | 11/2023 | Wei | H01Q 1/48 |
| 2006/0092083 | A1 * | 5/2006 | Chang | H01Q 9/0442<br>343/702 |
| 2008/0180333 | A1 * | 7/2008 | Martiskainen | H01Q 1/38<br>343/722 |
| 2009/0179803 | A1 * | 7/2009 | Tsai | H01Q 9/42<br>343/700 MS |
| 2012/0242555 | A1 * | 9/2012 | Hsieh | H01Q 5/378<br>343/860 |
| 2015/0200457 | A1 * | 7/2015 | Chan | H01Q 5/357<br>343/700 MS |
| 2017/0162942 | A1 * | 6/2017 | Wu | H01Q 5/371 |
| 2018/0048076 | A1 * | 2/2018 | Wei | H01Q 21/30 |
| 2020/0185831 | A1 * | 6/2020 | Chen | H01Q 9/30 |
| 2020/0243962 | A1 * | 7/2020 | Lo | H01Q 5/10 |
| 2021/0044000 | A1 * | 2/2021 | Chang | H01Q 1/38 |
| 2021/0249776 | A1 * | 8/2021 | Wei | H01Q 5/328 |
| 2022/0109250 | A1 * | 4/2022 | Tsai | H01Q 1/38 |
| 2022/0399907 | A1 * | 12/2022 | Wei | H01Q 1/48 |
| 2023/0163455 | A1 * | 5/2023 | Chang | H01Q 5/378<br>343/848 |
| 2023/0223710 | A1 * | 7/2023 | Chen | H01Q 9/0414<br>343/702 |
| 2023/0231310 | A1 * | 7/2023 | Zhang | H01Q 9/045<br>343/848 |
| 2024/0021988 | A1 * | 1/2024 | Zhao | H01Q 1/48 |

* cited by examiner

300

WEARABLE DEVICE WITH ANTENNA STRUCTURE THEREIN

CROSS REFERENCE TO RELATED APPLICATIONS

This application claims priority of Taiwan Patent Application No. 111127026 filed on Jul. 19, 2022, the entirety of which is incorporated by reference herein.

BACKGROUND OF THE INVENTION

Field of the Invention

The disclosure relates in general to a wearable device, and in particular to a wearable device and an antenna structure therein.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient operational bandwidth, it may degrade the communication quality of the relative mobile device. Accordingly, it has become a critical challenge for antenna designers to design a small-size, wideband antenna structure.

BRIEF SUMMARY OF THE INVENTION

In an exemplary embodiment, the invention is directed to a wearable device that includes a ground element, a first radiation element, a second radiation element, a third radiation element, a fourth radiation element, and a fifth radiation element. The first radiation element has a feeding point, and is coupled to a first grounding point on the ground element. A slot region is surrounded by the first radiation element and the ground element. The second radiation element is coupled to a second grounding point on the ground element. The third radiation element is coupled to the second grounding point. The third radiation element and the second radiation element substantially extend in opposite directions. The fourth radiation element is disposed inside the slot region. The fifth radiation element is disposed inside the slot region. The first radiation element is further coupled through the fourth radiation element and the fifth radiation element to the first grounding point. An antenna structure is formed by the first radiation element, the second radiation element, the third radiation element, the fourth radiation element, and the fifth radiation element.

In some embodiments, the first radiation element further includes a first widening portion and a second widening portion, and the first widening portion is adjacent to the feeding point.

In some embodiments, a first coupling gap is formed between the second radiation element and the ground element, and a second coupling gap is formed between the third radiation element and the first widening portion of the first radiation element. The width of each of the first coupling gap and the second coupling gap is smaller than or equal to 1 mm.

In some embodiments, the slot region substantially has an L-shape.

In some embodiments, each of the second radiation element and the third radiation element substantially has a straight-line shape.

In some embodiments, each of the fourth radiation element and the fifth radiation element substantially has an N-shape.

In some embodiments, the antenna structure covers a first frequency band, a second frequency band, and a third frequency band. The first frequency band is from 2400 MHz to 2500 MHz. The second frequency band is from 5150 MHz to 5850 MHz. The third frequency band is from 5925 MHz to 7125 MHz.

In some embodiments, the length of the first radiation element is substantially equal to 0.5 wavelength of the first frequency band.

In some embodiments, the length of the second radiation element is substantially equal to 0.25 wavelength of the second frequency band.

In some embodiments, the length of the third radiation element is substantially equal to 0.25 wavelength of the third frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
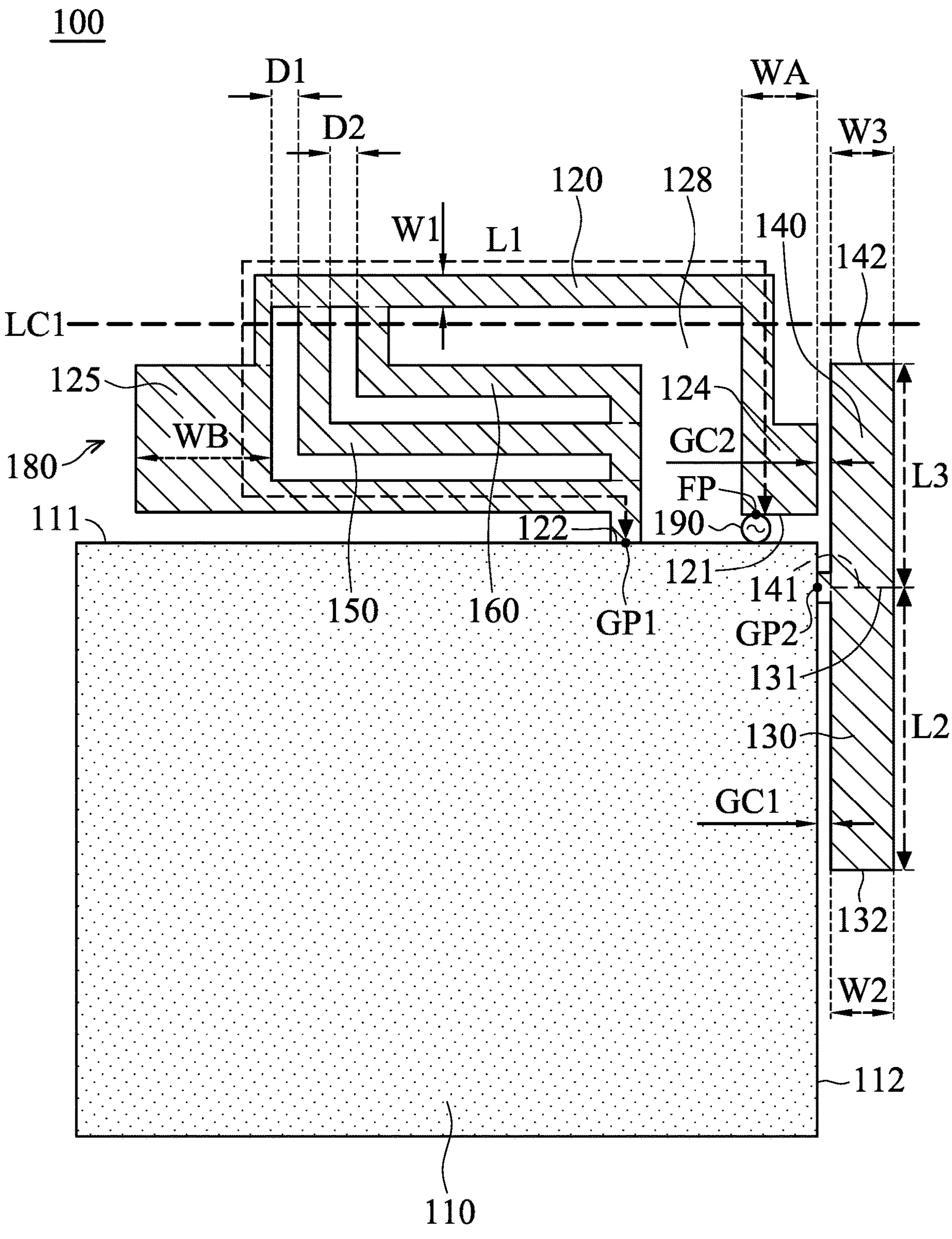
FIG. 1 is a diagram of a wearable device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a wearable device 100 according to an embodiment of the invention. For example, the wearable device 100 may be an HMD (Head Mounted Display), smart glasses, or a smart watch, but it is not limited thereto. In some embodiments, the wearable device 100 may be applied in the fields of VR (Virtual Reality), MR (Mixed Reality), or AR (Augmented Reality).

In the embodiment of FIG. 1, the wearable device 100 includes a ground element 110, a first radiation element 120, a second radiation element 130, a third radiation element 140, a fourth radiation element 150, and a fifth radiation element 160. The ground element 110, the first radiation element 120, the second radiation element 130, the third radiation element 140, the fourth radiation element 150, and the fifth radiation element 160 may all be made of metal materials, such as copper, silver, aluminum, iron, or their alloys. It should be understood that the wearable device 100 may further include other components, such as a processor, a display device, a supply module, and/or a housing, although they are not displayed in FIG. 1.

The ground element 110 may be implemented with a ground copper foil, which can provide a ground voltage. For example, the ground element 110 may be coupled to a system ground plane (not shown) of the wearable device 100.

The first radiation element 120 may substantially have a meandering shape. Specifically, the first radiation element 120 has a first end 121 and a second end 122. A feeding point FP is positioned at the first end 121 of the first radiation element 120. The second end 122 of the first radiation element 120 is coupled to a first grounding point GP1 on the ground element 110. The feeding point FP may be further coupled to a signal source 190. For example, the signal source 190 may be an RF (Radio Frequency) module. In some embodiments, the first radiation element 120 further includes a first widening portion 124 and a second widening portion 125. The first widening portion 124 of the first radiation element 120 may substantially have a relatively small rectangular shape, which may be adjacent to the feeding point FP. The second widening portion 125 of the first radiation element 120 may substantially have a relatively large rectangular shape. In addition, a slot region 128 is surrounded by the first radiation element 120 and the ground element 110. The slot region 128 may substantially have an L-shape, but it is not limited thereto. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0).

The second radiation element 130 may substantially have a straight-line shape. Specifically, the second radiation element 130 has a first end 131 and a second end 132. The first end 131 of the second radiation element 130 is coupled to a second grounding point GP2 on the ground element 110. The second end 132 of the second radiation element 130 is an open end. It should be noted that the second grounding point GP2 is different from the aforementioned first grounding point GP1. For example, the ground element 110 may have a first edge 111 and a second edge 112 which are perpendicular to each other. The first grounding point GP1 may be positioned at the first edge 111 of the ground element 110. The second grounding point GP2 may be positioned at the second edge 112 of the ground element 110. In some embodiments, a first coupling gap GC1 is formed between the second radiation element 130 and the second edge 112 of the ground element 110.

The third radiation element 140 may substantially have another straight-line shape. Specifically, the third radiation element 140 has a first end 141 and a second end 142. The first end 141 of the third radiation element 140 is coupled to the second grounding point GP2. The second end 142 of the third radiation element 140 is an open end. For example, the second end 142 of the third radiation element 140 and the second end 132 of the second radiation element 130 may substantially extend in opposite directions and away from each other. In some embodiments, a second coupling gap GC2 is formed between the third radiation element 140 and the first widening portion 124 of the first radiation element 120.

The fourth radiation element 150 may substantially have an N-shape. The fifth radiation element 160 may substantially have another N-shape. The fourth radiation element 150 and the fifth radiation element 160 are both disposed inside the aforementioned slot region 128. Furthermore, the first radiation element 120 is further coupled through the fourth radiation element 150 and the fifth radiation element 160 to the first grounding point GP1.

In a preferred embodiment, an antenna structure 180 of the wearable device 100 is formed by the first radiation element 120, the second radiation element 130, the third radiation element 140, the fourth radiation element 150, and the fifth radiation element 160. For example, the antenna structure 180 of the wearable device 100 may be a planar antenna structure disposed on a dielectric substrate or a nonconductive support element (not shown). However, the invention is not limited thereto. In alternative embodiments, the antenna structure 180 of the wearable device 100 is modified along a bending line LC1, so as to form a 3D (Three-Dimensional) antenna structure, without affecting its operational performance.

Figure 2:
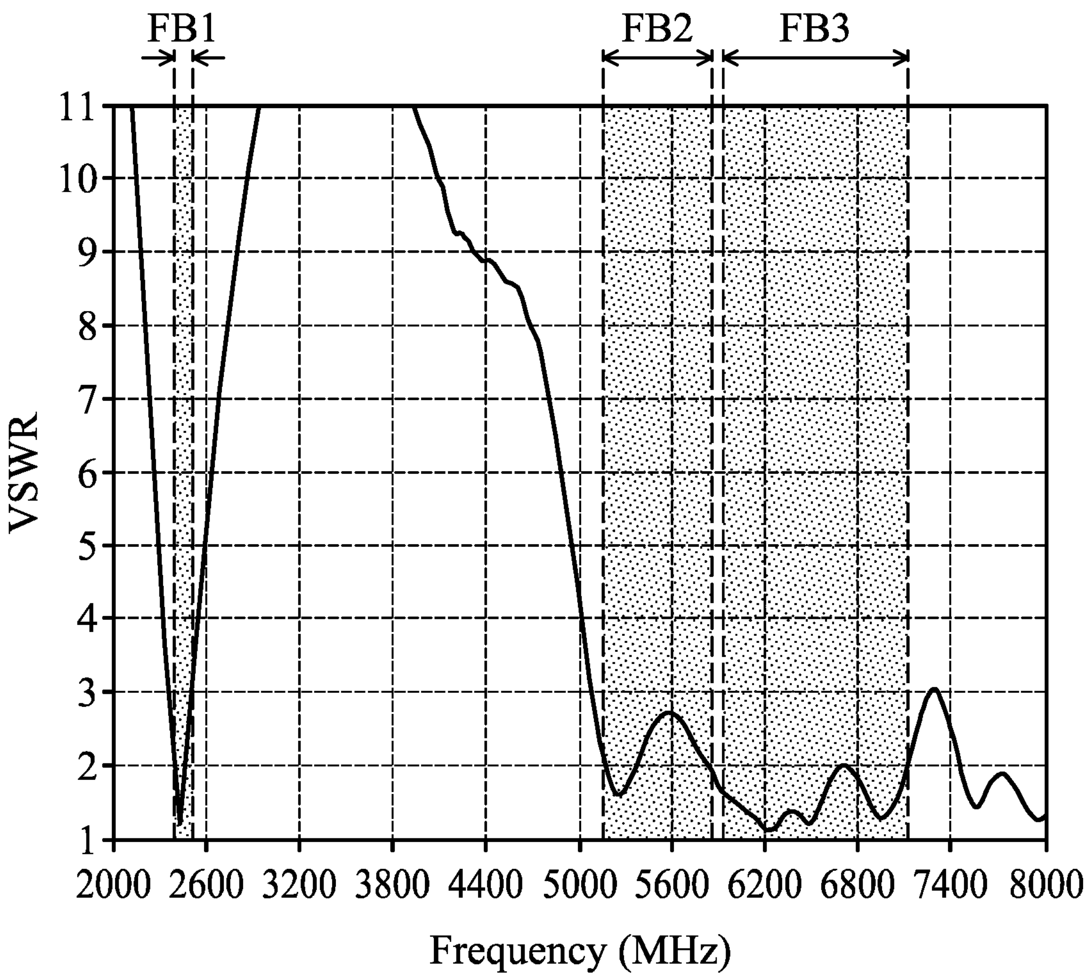
FIG. 2 is a diagram of VSWR (Voltage Standing Wave Ratio) of an antenna structure of a wearable device according to an embodiment of the invention.

FIG. 2 is a diagram of VSWR (Voltage Standing Wave Ratio) of the antenna structure 180 of the wearable device 100 according to an embodiment of the invention. The horizontal axis represents the operational frequency (MHz), and the vertical axis represents the VSWR. According to the measurement of FIG. 2, the antenna structure 180 of the wearable device 100 can cover a first frequency band FB1, a second frequency band FB2, and a third frequency band FB3. For example, the first frequency band FB1 may be from 2400 MHz to 2500 MHz, the second frequency band FB2 may be from 5150 MHz to 5850 MHz, and the third frequency band FB3 may be from 5925 MHz to 7125 MHz. Therefore, the antenna structure 180 of the wearable device 100 can support at least the wideband operations of conventional WLAN (Wireless Local Area Network) and next-generation Wi-Fi 6E.

The operational principles of the antenna structure 180 of the wearable device 100 of some embodiments are described below. The first radiation element 120 is excited to generate the first frequency band FB1. The second radiation element 130 is excited by the first radiation element 120 using a coupling mechanism, so as to form the second frequency band FB2. The third radiation element 140 is excited by the first radiation element 120 using another coupling mechanism, so as to form the third frequency band FB3. In addition, the first widening portion 124 and the second widening portion 125 of the first radiation element 120 are configured to fine-tune the resonant mechanism of the first frequency band FB1. The fourth radiation element 150 is configured to control the impedance matching of the third frequency band FB3. The fifth radiation element 160 is configured to control the impedance matching of the second frequency band FB2.

The element sizes of the wearable device 100 of some embodiments are described below. The length L1 of the first radiation element 120 may be substantially equal to 0.5 wavelength (λ/2) of the first frequency band FB1 of the antenna structure 180 of the wearable device 100. The width WA of the first widening portion 124 of the first radiation element 120 may be from 2 mm to 4 mm. The width WB of the second widening portion 125 of the first radiation element 120 may be from 4 mm to 6 mm. The width W1 of the other portions of the first radiation element 120 may be from 0.5 mm to 1.5 mm. The length L2 of the second radiation element 130 may be substantially equal to 0.25 wavelength (λ/4) of the second frequency band FB2 of the antenna structure 180 of the wearable device 100. The width W2 of the second radiation element 130 may be from 1 mm to 2 mm. The length L3 of the third radiation element 140 may be substantially equal to 0.25 wavelength (λ/4) of the third frequency band FB3 of the antenna structure 180 of the wearable device 100. The width W3 of the third radiation element 140 may be from 1 mm to 2 mm. The width of the first coupling gap GC1 may be shorter than or equal to 1 mm. The width of the second coupling gap GC2 may be shorter than or equal to 1 mm. The distance D1 between the fourth radiation element 150 and the second widening portion 125 of the first radiation element 120 may be from 0.5 mm to 1 mm. The distance D1 between the fifth radiation element 160 and the fourth radiation element 150 may be from 0.5 mm to 1 mm. The above ranges of element sizes and parameters are calculated and obtained according to many experiment results, and they help to optimize the operational bandwidth and impedance matching of the antenna structure 180 of the wearable device 100.

Figure 3:
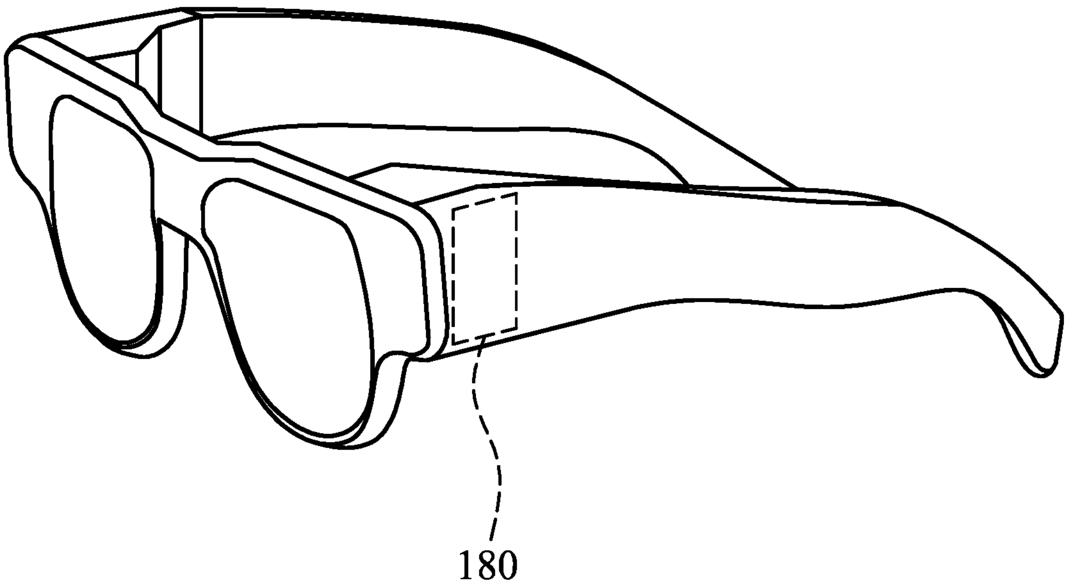
FIG. 3 is a perspective view of an HMD (Head Mounted Display) according to an embodiment of the invention.

FIG. 3 is a perspective view of an HMD 300 according to an embodiment of the invention. In the embodiment of FIG. 3, the HMD 300 is implemented with smart glasses, and the aforementioned antenna structure 180 is positioned at one side of the smart glasses. In addition, a metal frame of the smart glasses can be used as a system ground plane. Other features of the wearable device 300 of FIG. 3 are similar to those of the wearable device 100 of FIG. 1. Accordingly, the two embodiments can achieve similar levels of performance.

The invention proposes a novel wearable device and a novel antenna structure therein. In comparison to the conventional design, the invention has at least the advantages of small size, wide bandwidth, and low manufacturing cost. Therefore, the invention is suitable for application in a variety of fields of VR, MR and AR.

Note that the above element sizes, element shapes, and frequency ranges are not limitations of the invention. An antenna designer can fine-tune these settings or values according to different requirements. It should be understood that the wearable device of the invention is not limited to the configurations of FIGS. 1-3. The invention may merely include any one or more features of any one or more embodiments of FIGS. 1-3. In other words, not all of the features displayed in the figures should be implemented in the wearable of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wearable device, comprising:

a ground element;

a first radiation element, having a feeding point, and coupled to a first grounding point on the ground element, wherein a slot region is surrounded by the first radiation element and the ground element;

a second radiation element, coupled to a second grounding point on the ground element;

a third radiation element, coupled to the second grounding point, wherein the third radiation element and the second radiation element substantially extend in opposite directions;

a fourth radiation element, disposed inside the slot region; and a fifth radiation element, disposed inside the slot region, wherein the first radiation element is further coupled through the fourth radiation element and the fifth radiation element to the first grounding point;

wherein an antenna structure is formed by the first radiation element, the second radiation element, the third radiation element, the fourth radiation element, and the fifth radiation element.

2. The wearable device as claimed in claim 1, wherein the first radiation element further comprises a first widening portion and a second widening portion, and the first widening portion is adjacent to the feeding point.

3. The wearable device as claimed in claim 1, wherein a first coupling gap is formed between the second radiation element and the ground element, a second coupling gap is formed between the third radiation element and the first widening portion of the first radiation element, and a width of each of the first coupling gap and the second coupling gap is smaller than or equal to 1 mm.

4. The wearable device as claimed in claim 1, wherein the slot region substantially has an L-shape.

5. The wearable device as claimed in claim 1, wherein each of the second radiation element and the third radiation element substantially has a straight-line shape.

6. The wearable device as claimed in claim 1, wherein the antenna structure covers a first frequency band, a second frequency band, and a third frequency band, the first frequency band is from 2400 MHz to 2500 MHz, the second frequency band is from 5150 MHz to 5850 MHz, and the third frequency band is from 5925 MHz to 7125 MHz.

7. The wearable device as claimed in claim 6, wherein a length of the first radiation element is substantially equal to 0.5 wavelength of the first frequency band.

8. The wearable device as claimed in claim 6, wherein a length of the second radiation element is substantially equal to 0.25 wavelength of the second frequency band.

9. The wearable device as claimed in claim 6, wherein a length of the third radiation element is substantially equal to 0.25 wavelength of the third frequency band.

* * * * *